United States Patent
Sepulchre et al.

(10) Patent No.: US 6,962,721 B1
(45) Date of Patent: Nov. 8, 2005

(54) **USE OF STRAINS OF *STREPTOCOCCUS THERMOPHILUS* WHICH ARE INCAPABLE OF HYDROLYZING UREA IN DAIRY PRODUCTS**

(75) Inventors: Anne-Marie Sepulchre, Saint-Avertin (FR); Christophe Monnet, Plaisir (FR); Georges Corrieu, Viroflay (FR)

(73) Assignees: Texel, St. Romain (FR); Institut National de la Recherche Agronomique, Paris (FR)

( * ) Notice: Subject to any disclaimer, the term of this patent is extended or adjusted under 35 U.S.C. 154(b) by 329 days.

(21) Appl. No.: 10/088,350

(22) PCT Filed: Sep. 15, 2000

(86) PCT No.: PCT/FR00/02577

§ 371 (c)(1),
(2), (4) Date: Jun. 14, 2002

(87) PCT Pub. No.: WO01/22828

PCT Pub. Date: Apr. 5, 2001

(30) Foreign Application Priority Data

Sep. 17, 1999 (FR) .................................. 99 11677

(51) Int. Cl.⁷ .............................................. A23C 9/12
(52) U.S. Cl. ..................... 426/43; 426/61; 426/582; 426/583
(58) Field of Search ............................. 426/36, 42, 43, 426/61, 582, 583; 435/885, 253.4

(56) References Cited

U.S. PATENT DOCUMENTS 5,116,737 A * 5/1992 McCoy ........................ 435/42

6,056,979 A * 5/2000 Benbadis et al. ............. 426/34

FOREIGN PATENT DOCUMENTS

WO WO 96/10627 4/1996

OTHER PUBLICATIONS

W. Tinson, "Metabolism of streptococcus thermophilus," The Australian Journal of Dairy Technology, vol. 37, No. 1, 1982, pp. 17-21.
B. Bianchi Salvadori, "Characteristics of some streptococcus thermophilus strains for the preparation of starters dehydrated . . . ", Scienza E. Tecnica Lattiero-Cassearia, vol. 34, No. 4, 1983, pp. 227-248.
A. Zourari, "Caracterisation de bacteries lactiques thermophiles isoleos de yaourts artisanaux grecs," Le Lait, vol. 77, No. 4, 1991, pp. 445-461 (Not translated).
V. Juillard, "Mise en evidence d'uno activite ureasique chez Streptococcus thermpohilus," Canadian Journal of Microbiology, vol. 34, No. 6, 1998, pp. 818-822.
Stoyanov et al., *Neuchni Trudove, Vissh Institut po Khraniteine i Vkusona Promishlenost* (1995), 40:211-217, Plovid, Bularia, with full English translation.
Other Document: May 25, 2004 e-mail from Henk Spierenburg regarding S. thermophilus CNRZ 407 strain.

* cited by examiner

Primary Examiner—Keith Hendricks
(74) Attorney, Agent, or Firm—Burns, Doane, Swecker & Mathis, LLP

(57) ABSTRACT

The invention relates to the use of at least one strain of *Streptococcus thermophilus* which is incapable of hydrolyzing urea in the manufacture of cheese or fermented dairy products such as yogurts in order to obtain an acidification kinetic which is independent from the content of various components of the milk.

7 Claims, 15 Drawing Sheets

USE OF STRAINS OF *STREPTOCOCCUS THERMOPHILUS* WHICH ARE INCAPABLE OF HYDROLYZING UREA IN DAIRY PRODUCTS

The present invention relates to controlling the acidification kinetic of milk during the manufacture of cheeses or fermented milks such as yoghurts, through the use of *Streptococcus thermophilus* bacteria which are at least partially, preferably totally, incapable of hydrolyzing urea.

*Streptococcus thermophilus* is a thermophilic lactic bacterium used as a lactic ferment in the dairy industry. Used first of all for the manufacture of fermented milks such as yoghurt, it is now increasingly used in cheese production.

This bacterium converts lactose into lactic acid, and through this has an acidifying activity. In the case of cheeses notably, this acidification not only encourages the action of the rennet and the synaeresis of the curds but also inhibits the growth of many undesirable bacteria, certain of which are pathogenic bacteria, and even allows their elimination at a greater or lesser speed.

The acidifying activity of this bacterium is however accompanied by a urea hydrolysis activity, an activity that affects the acidification kinetic. Tinson et al (1982a) showed that the urea hydrolysis reaction, giving-carbon dioxide and ammonia, resulted in a temporary decrease in the acidification speed, measured by means of a pH probe. The authors of this article conclude therefrom that the changes in pH cannot be used to measure the lactic acid production in *S. thermophilus* cultures, since the results that would be obtained would be erroneous owing to the production of ammonia. Furthermore, Spinnier and Corrieu in 1989 observed that the addition of urea led to a drop in the acidification speed.

On an industrial scale, the hydrolysis of urea by *Streptococcus thermophilus* poses a number of problems.

This is because, in cheese manufacturing for example, the technological operations (cutting of the curds, stirring, etc.) must take place at given values of pH, but in practice these operations are generally carried out at predetermined times. Therefore the variations in acidifying activity due to urea hydrolysis lead to defects and significant variability in the cheeses (texture, moisture level, ripening). Martin et al (1997) thus observed that the variations in urea content caused changes in the acidification kinetics and in the texture of Reblochon type cheeses, confirming the results obtained by Spinnier and Corrieu (1989).

Moreover, the production of ammonia increases the time necessary to reach a given pH. This results in the equipment being tied up for longer and in an increase in the risk of contamination by undesirable micro-organisms.

Furthermore, it is desirable that the cheese-making whey does not contain an excessive amount of ammonia, since this whey is often used in animal feed.

This phenomenon is difficult to control, notably since the urea content of milk is variable (generally from 2 to 8 mM) and depends in particular on the feeding of the livestock. To overcome this problem, Martin et al (1997) proposed measuring the urea content of the milk and then adapting the manufacturing parameters. However, the use of such a urea quantitative analysis system would be highly constraining, and would not in any case resolve the drawbacks due to slowing down of the acidification speed in the presence of urea (equipment tied up for a longer time, increase in the risks of contamination, etc.) and to a high ammonia content of the whey.

The authors of the present invention have revealed that the use of *Streptococcus thermophilus* strains not, or not totally, hydrolyzing urea, as lactic ferments in the production of dairy products, made it possible to solve the aforementioned problems. These strains are designated "ur(−) strains" in the remainder of this application.

Until now, the only ur(−) *Streptococcus thermophilus* strains described are the CNRZ 407 strain (Juilliard et al, 1988) and the mutant strain isolated by Tinson et al (1982b). However, the information known relating to these two strains does not allow the technological importance of ur(−) strains to be realized.

One object of the present invention is therefore the use of at least one strain of *Streptococcus thermophilus* which is at least partially, preferably totally, incapable of hydrolyzing urea, during the manufacture of cheeses or fermented dairy products such as yoghurts, in order to obtain an acidification kinetic which is substantially independent of the content of the milk in terms of its constituents.

Within the context of the present invention, "the acidification kinetic" means the variation in pH of the fermentation medium as a function of time.

"Content of the milk in terms of its constituents" means in particular the urea content of the milk, which differs from one milk to another, depending on the origin of the animal or its feed. It also means the content of the milk in terms of other constituents which are involved in the metabolism of urea. Amongst these constituents can be cited for example nickel or cobalt. These constituents may be present naturally in the raw material used (the milk) or may have been added.

Another object or the invention is a method for obtaining, during the manufacture of cheeses or fermented dairy products such as yoghurts, an acidification kinetic which is substantially independent of the content of the milk in terms of its constituents, in which there is incorporated with the milk at least one strain of *Streptococcus thermophilus* which is at least partially, preferably totally, incapable of hydrolyzing urea.

The ur (−) *Streptococcus thermophilus* strains used in accordance with the present invention can be obtained by a mutagenic treatment or by spontaneous mutation, or also be isolated in nature.

The strains 298-K and 298-10, which are respectively a spontaneous mutant and a mutant obtained after mutagenic treatment, were registered at the CNCM on 14 Sep. 1999 under the numbers I-2311 and I-2312, respectively.

Any ur(−) strain cultured according to the protocol of Tinson et al (1982b), or preferably according to the protocol described in Example I, can also be used.

The ur (−) *Streptococcus thermophilus* strains can be used alone or in a mixture with other micro-organisms such as *lactococci, lactobacilli*, or any other micro-organism usable in the dairy industry.

The authors of the present invention have shown that the importance of the ur(−) *Streptococcus thermophilus* strains is multifaceted. In fact, they have revealed that the ur(−) mutants make it possible not only to have control over the variations in acidification kinetics, but that they are moreover stable and exhibit good growth in milk.

Furthermore, the ur(−) strains make it possible to obtain acidification kinetics of milk which are regular, do not exhibit any temporary slowing down, and are a function of the area concentration, unlike the kinetics observed with the ur(+) strains.

The ur(−) strains do not produce ammonia during their growth in milk, which is advantageous from the point of view of using the whey in animal feed.

Finally, the strains selected for their ur(−) phenotype surprisingly have variable acidifying characteristics, compared with the acidification kinetics observed with the parent strains.

"Variable acidification kinetic" means an acidification kinetic which is for example faster or slower compared with the acidification kinetics observed with the parent strains. "Heterogeneity" between the acidification kinetics of the different ur(−) mutants with regard to the parent strains can also be spoken of.

Another object of the invention is therefore a method of selecting *Streptococcus thermophilus* strains useful during the manufacture of cheeses or fermented dairy products, in which mutant strains of *Streptococcus thermophilus* which are at least partially, preferably totally, incapable of hydrolyzing urea, allowing an acidification kinetic to be obtained which is substantially independent of the content of the milk in terms of its constituents, are selected for their ability to acidify a milk according to acidification kinetics which are variable compared with the acidification kinetics of the parent strains.

In general terms, the choice of the acidifying properties of the ur(−) strains can be made as a function of the cheese or fermented milk manufacturing technology for which these strains are used.

Thus, certain ur(−) strains are characterised more particularly by an absence of the post-acidification phenomenon.

For other strains, the time necessary to reach a given pH proves to be shorter than for the parent ur(+) strains. Thus, this property makes it possible to seed the milk with a ur(−) mutant strain at a rate lower than the rate generally used for the parent ur(+) strain. This rate can be around 25%, perhaps even around 50% lower compared with the rate that would be used for the parent strain.

One object of the present invention is therefore a method according to the invention, in which there is incorporated with the milk at least one mutant strain of *Streptococcus thermophilus* which is at least partially, preferably totally, incapable of hydrolyzing urea, at a seeding rate lower than the seeding rate used for the parent strain of *Streptococcus thermophilus* capable of hydrolyzing urea.

The figures and examples below illustrate the invention without limiting the scope thereof.

LEGEND FOR THE FIGURES

EXAMPLES

Example 1

Figure 1A:
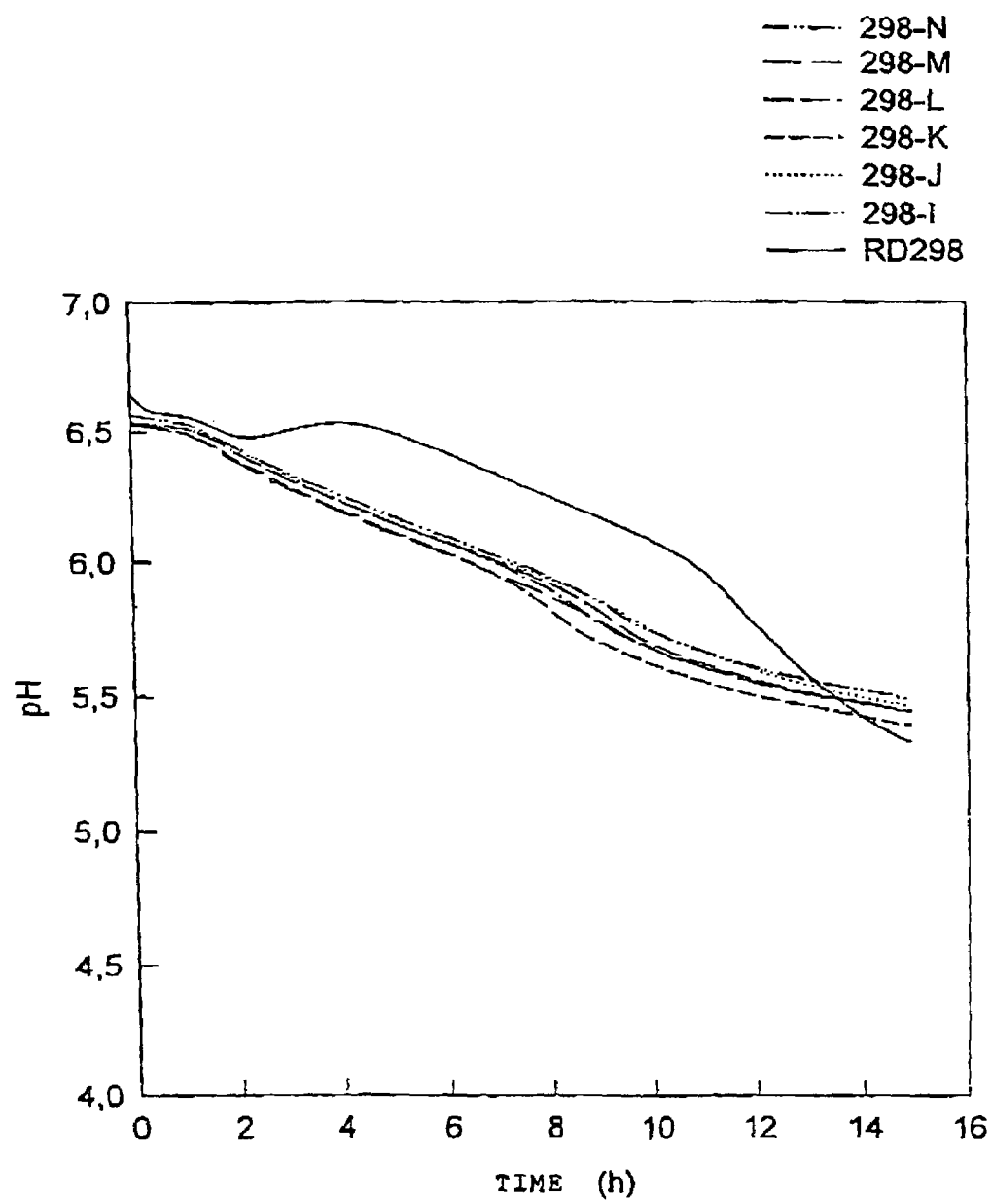
FIGS. 1A–1B depicts acidification curves for reconstituted skimmed milk, obtained with the ur(+) strain RD298 and with the spontaneous ur(−) mutants (FIG. 1A) or those obtained after treatment with NTG (FIG. 1B).

Method of Culturing Ur(−) Bacteria on Petri Dishes.

An agar-based medium whose composition is shown in Table 1 is prepared and poured into Petri dishes of diameter equal to 9 cm.

TABLE 1

| Composition of the culture medium. | |
|---|---|
| Tryptone[a] | 2.5 g |
| Pepsic meat peptone[a] | 2.5 g |
| Papainic soya peptone[a] | 5 g |
| Autolytic yeast extract[b] | 2.5 g |
| Meat extract[a] | 5 g |
| Sugar (glucose, lactose or saccharose) | 5 g |
| Sodium glycerophosphate.$6H_2O$ | 19 g |
| Magnesium sulphate | 0.25 g |
| Ascorbic acid | 0.5 g |
| Agar | 15 g |
| Distilled, water | 1 litre |

[a]Blokar company
[b]Fischer Scientific company

If need be, a cofactor of urease can be added to this medium. Adjust the pH to 7.0 and autoclave for 15 minutes at 115° C.

The *St. thermophilus* cells to be analyzed are seeded on this medium so as to obtain around 100 colonies per Petri dish. The cultures take place under anaerobic conditions at a temperature of 35–45° C., preferably 37–42° C.

After two days of culture, there is poured over each Petri dish around 20 ml of an agar-based solution prepared as follows: dissolve by heating 15 g of agar in 1 liter of a potassium phosphate buffer solution at 50 mM (pH 6) supplemented with 100 mg/l of bromothymol blue, cool the solution to 50° C., add 10 g of urea and acidify the medium with hydrochloric acid until a yellowish-orange colour is obtained.

After solidification of the agar, the Petri dishes are incubated for 1 hour at 37° C. The ur(+) clones form blue-coloured halos owing to the production of ammonia, whereas the ur (−) clones form yellow colonies. When the ur(−) mutants are sought, the clones not forming a blue halo are recovered and tested again on the same culture medium in order to confirm the ur(−) characteristic. It should also be verified that these mutants do not consume urea (or consume it only partially) when they are cultured in milk.

Example 2

Selection of Mutants for the Metabolism of Urea.

Mutants not consuming urea, or consuming it slightly, were sought from the RD298, RD672 and STS888 strains of *St. thermophilus*. Two approaches were used. In the first approach, the mutants were sought after treatment with a mutagenic agent, while in the second approach, spontaneous mutants were sought.

a) Selection by Means of a Mutagenic Agent

The mutagenic treatment is carried out as described below.

The strains are cultured at 42° C. in 5 ml of M17 culture medium (Terzaghi and Sandine, 1975). The culture is stopped at the end of the exponential phase, and the cells are recovered by centrifuging and then washed with 100 mM (pH 7) phosphate buffer. The cells are next recovered in 1 ml of buffer containing a variable content of N-methyl-N'-nitro-N-nitrosoguanidine (NTG) and incubated for 1 hour at 42° C. The cells are next washed twice with 5 ml of buffer and seeded on the culture medium so as to obtain around 100 colonies per Petri dish. The culture is carried out as described previously (Example 1). Table 2 describes the results obtained during 3 mutageneses.

TABLE 2

Selection of ur(-) mutants after treatment with a mutagenic agent (NTG).

| St. thermophilus strain | NTG concentration used (µg/ml) | Viability (% of cells having survived the NTG) | Number of colonies cultured | Number of ur(-) clone obtained | Proportion of ur(-) clones (%) |
|---|---|---|---|---|---|
| ST888 | 20 | 10 | 980 | 11 | 1.1 |
| ST888 | 5 | 48 | 1000 | 5 | 0.5 |
| RD672 | 50 | 41 | 10600 | 41 | 0.4 |
| RD298 | 50 | 16 | 3200 | 15 | 0.5 | b) Selection of Spontaneous Mutants

In a population of micro-organisms, there often exist spontaneous mutants for a gene or a given characteristic. This type of mutant is of great interest, since the fact that no mutagenic agent has been used eliminates the risk of causing non-sought-after mutations (mutations other than for the characteristic studied), which might impair the technological abilities of the strains. However, the frequency of spontaneous mutants within a population for a given characteristic is generally very low, of the order of 1 in 1 million (variable depending on the strain and characteristic). Therefore the selection of spontaneous mutants generally requires either the development of a method making it possible to culture a very high number of clones, or the definition of a procedure for enriching mutants. No procedure for enriching ur(-) mutants has a priori been described. Moreover, given that the procedure of culturing on Petri dishes does not allow the analysis of more than 100 colonies of St. thermophilus per dish, the selection of spontaneous mutants might have been expected to be unfeasible, since it would have been necessary to culture several thousand, perhaps even tens of thousands, of Petri dishes, in order to have chances of isolating a spontaneous mutant. However, the authors of the present invention noticed that, in the St. thermophilus cultures, the proportion of spontaneous ur(-) mutants was high (around 1 in 2500 for ST888, 1 in 4000 for RD672 and 1 in 1200 for RD298), and that it is therefore possible to easily isolate this type of mutant (Table 3).

TABLE 3

Selection of spontaneous ur(-) mutants. The protocol used is the same as that described in paragraph a) "selection by means of a mutagenic agent", except that the mutagenic agent is omitted.

| St. thermophilus strain | Number of colonies cultured | Number of ur(-) clones obtained | Proportion of ur(-) clones (%) |
|---|---|---|---|
| ST888 | 16000 | 6 | 0.04 |
| RD298 | 7400 | 6 | 0.08 |
| RD672 | 24000 | 6 | 0.03 |

47 of the 90 mutants obtained were studied. The results relating to stability, enzymatic characterization and the acidifying behaviour of these mutants are described below.

Example 3

Properties of the Ur(-) Mutants.

a) Stability of the Mutants

In order to be able to be usable in an industrial context, the ur(-) mutants must be stable. However, no data existed as regards the stability of ur(-) mutants of St. thermophilus. The authors of the present invention studied the stability of 47 mutants originating from the strains ST888, RD672 and RD298. The strains were subcultured daily in 10 ml of M17 culture medium, for 20 days. The cultures were inoculated at 1% and incubated at 42° C. The set of 20 subcultures represents around 130 generations. After the $20^{th}$ subculture, the strains were seeded in milk and it was determined whether or not they consumed urea (cultures of 15 hours at 42° C.). The results are shown in Table 4. It should be noted that the ur(-) mutants, whether they are obtained by a mutagenic treatment or are spontaneous mutants, are highly stable. In fact, only two reversions were detected for the 47 mutants tested.

TABLE 4

Study of the stability of the ur(-) mutants. The urea consumption was tested during cultures on milk, after 20 successive subcultures in M17 culture medium.

| St. thermophilus strain | Mutation | Number of ur(-) mutants tested | Number of mutants consuming urea after 20 subcultures |
|---|---|---|---|
| ST888 | NTG | 6 | 1 |
| ST888 | Spontaneous | 6 | 0 |
| RD298 | NTG | 5 | 0 |
| RD298 | Spontaneous | 6 | 0 |
| RD672 | NTG | 19 | 0 |
| RD672 | Spontaneous | 5 | 1 |
| Total | / | 47 | 2 | b) Enzymatic Characterisation of the Mutants

The strains studied were cultured for 24 hours, under anaerobic conditions and at 37° C., in a liquid culture medium whose composition is shown in Table 5. The cells were recovered by centrifuging, washed in buffer (HEPES 50 mM-EDTA 1 mM, pH 7.5), and then recovered in a volume of buffer representing 2% of the volume of the culture. The ureasic activity was then measured on acellular extracts (treatment of the cells in a ball mill and recovery of the supernatant from centrifuging for 5 minutes at 20,000 g).

TABLE 5

Composition of the culture medium used for preparing the extracts.

| | |
|---|---|
| Tryptone[a] | 10 g |
| Autolytic yeast extract[b] | 5 g |
| Sodium glycerophosphate.6H$_2$O | 19 g |
| Ascorbic acid | 500 mg |
| Magnesium sulphate | 250 mg |
| Nickel sulphate.7H$_2$O | 10 mg |
| Glucose | 10 g |
| Distilled water | 1 litre |

[a]Blokar company
[b]Fischer Scientific company

Adjust the pH to 7.0 and autoclave for 15 minutes at 115° C.

The ureasic activity measurements were carried out at 37° C., in HEPES 50 mM—EDTA 1 mM (pH 7.5) buffer. The reaction is triggered by the addition of 25 mM of urea, and the ammonia produced in 20 minutes is analyzed quantitatively, using Nessler's reagent. The results are expressed in units (U) of urease activity (one unit corresponds to one micromole of ammonia produced per minute) per milligram of protein.

Table 6 shows the activity values obtained. The ur(−) mutants did not exhibit any detectable ureasic activity, with the exception of the mutants 298-3.17 and 888-1.5. These correspond to mutants having a ur(+) phenotype in the presence of nickel and a ur(−) phenotype in the absence of this compound. Now, the culture medium used for preparing the acellular extracts contained nickel sulphate. In these two strains, the mutation probably focuses on the nickel transport system or the system allowing its incorporation into the active site of the urease.

These strains of St. thermophilus could also exhibit a ur(−) phenotype on account of an inability to transport urea. Such strains would therefore always possess a measurable ureasic activity in acellular extracts.

TABLE 6

Measurement of the ureasic activity of acellular extracts obtained from the parent strains and from the ur(−) mutants.

| Parent strain Mutant | Ureasic activity (U/mg) | Parent strain Mutant | Ureasic activity (U/mg) | Parent strain Mutant | Ureasic activity (U/mg) |
|---|---|---|---|---|---|
| RD298 | 0.94 | RD672 | 1.08 | ST888 | 0.95 |
| 298-10 | N.D. | 672-18(0) | N.D. | 888-A | N.D. |
| 298-K | N.D. | 672-47(0) | N.D. | 888-B | N.D. |
| 298-I | N.D. | 672-54(0) | N.D. | 888-C | N.D. |
| 298-J | N.D. | 672-19(0) | N.D. | 888-D | N.D. |
| 298-L | N.D. | 672-31(0) | N.D. | 888-1 | N.D. |
| 298-M | N.D. | 672-59(50) | N.D. | 888-2 | N.D. |
| 298-N | N.D. | 672-62(50) | N.D. | 888-2.6 | N.D. |
| 298-3.9 | N.D. | 672-61(50) | N.D. | 888-2.11 | N.D. |
| 298-3.3 | N.D. | 672-33(50) | N.D. | 888-2.9 | N.D. |
| 298-3.16 | N.D. | 672-55(50) | N.D. | 888-1.13 | N.D. |
| 298-3.17 | 0.58 | 672-53(50) | N.D. | 888-1.8 | N.D. |
| | | 672-70(50) | N.D. | 888-1.5 | 0.42 |
| | | 672-20(50) | N.D. | | |
| | | 672-50(50) | N.D. | | |
| | | 672-34(50) | N.D. | | |
| | | 672-22(50) | N.D. | | |
| | | 672-24(50) | N.D. | | |
| | | 672-10(50) | N.D. | | |
| | | 672-36(50) | N.D. | | |
| | | 672-60(50) | N.D. | | |
| | | 672-21(50) | N.D. | | | c) Acidifying Behaviour of the Mutants

In order to demonstrate the technological importance of the ur(−) strains, the authors of the invention compared their acidifying characteristics with those of the corresponding parent strains.

The following results were observed:
unlike the parent strains, the ur(−) mutants do not exhibit a temporary slowing down of the acidification speed due to hydrolysis of the urea; their acidification curves are therefore more regular;
the kinetics of acidification of the milk by the ur(−) mutants are little affected or not affected by the urea, nickel and cobalt contents;
furthermore, a high variability of the acidifying activities between the ur(−) mutants is observed, compared with the acidifying activities of the parent strains.

A breakdown of the results obtained is shown below. The cultures were seeded at 1% with a preculture carried out on sterilized reconstituted skimmed milk, then cultured at 37° C.

Cultures in reconstituted skimmed milk:

The milk was reconstituted at 100 g/l and pasteurized for 10 minutes at 90° C.

Figure 1B:
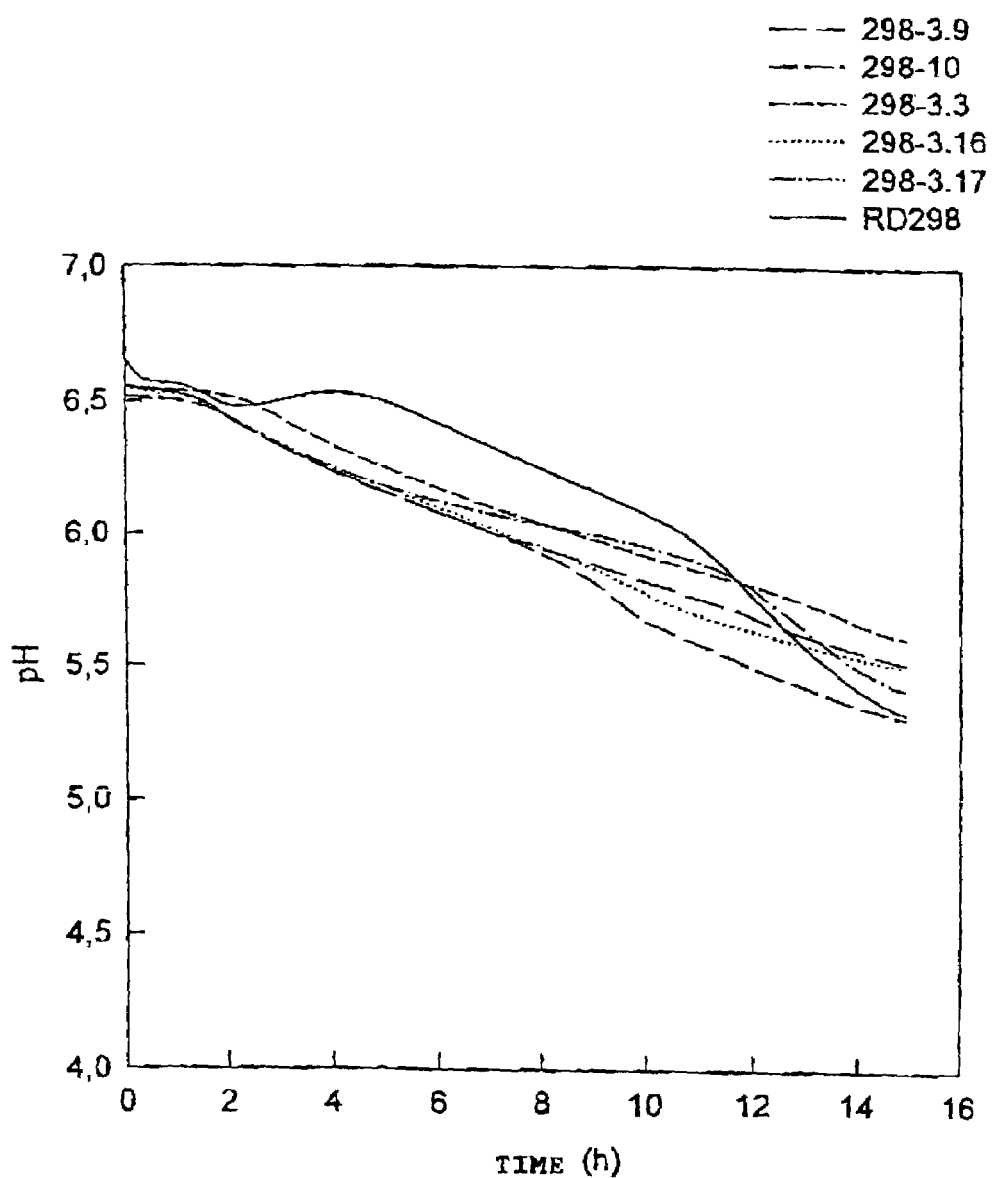

After around 2 hours of culture, a rise in pH in the culture of the strain RD298 is observed (FIG. 1). The 6 spontaneous mutants have a very regular acidification curve, with no pH rise nor temporary slowing down of the acidification speed. At certain times in the culture, the shift in acidification compared with the parent strain reaches almost 4 hours. This therefore allows a given value of pH to be reached more quickly. The importance of this observation is major: if it is wished to reach a given pH without reducing the incubation time, a ur(−) strain can be used, reducing the amount of seeding compared with the amount used with a ur(+) strain. Certain of the mutants obtained after treatment with NTG have a behaviour similar to the spontaneous mutants; others acidity the medium more slowly (298-3.3) or more quickly (298-10).

Figure 2A:
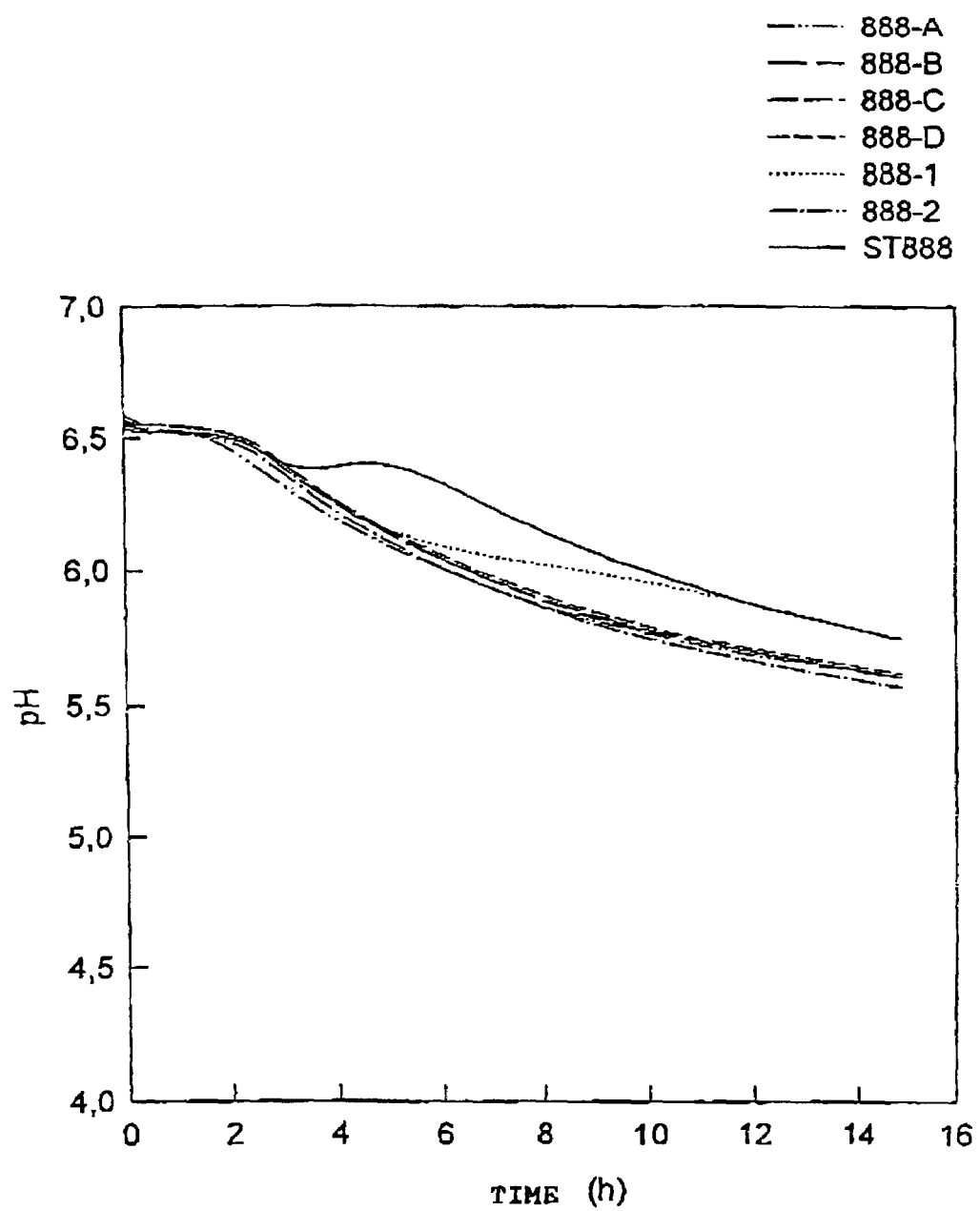
FIGS. 2A–2B depicts the acidification curves for reconstituted skimmed milk, obtained with the strain ST888 and with the spontaneous ur(−) mutants (FIG. 2A) or those obtained after treatment with NTG (FIG. 2B).
Figure 2B:
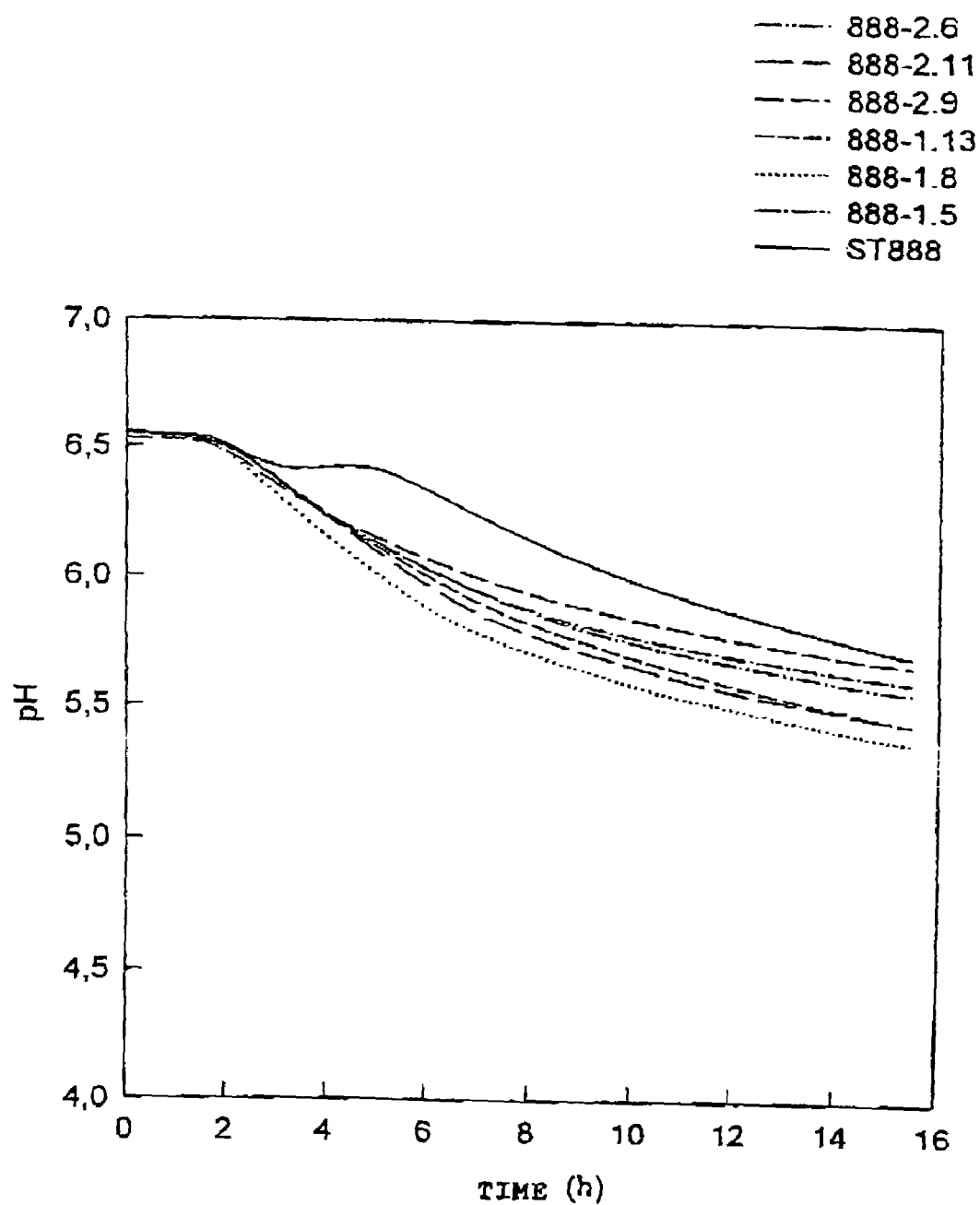

With the exception of the mutant 888-1 the ur(−) spontaneous mutants of ST888 have the same acidification curve. As for RD298, a more regular and faster acidification is observed with the mutants (FIG. 2).

Figure 3A:
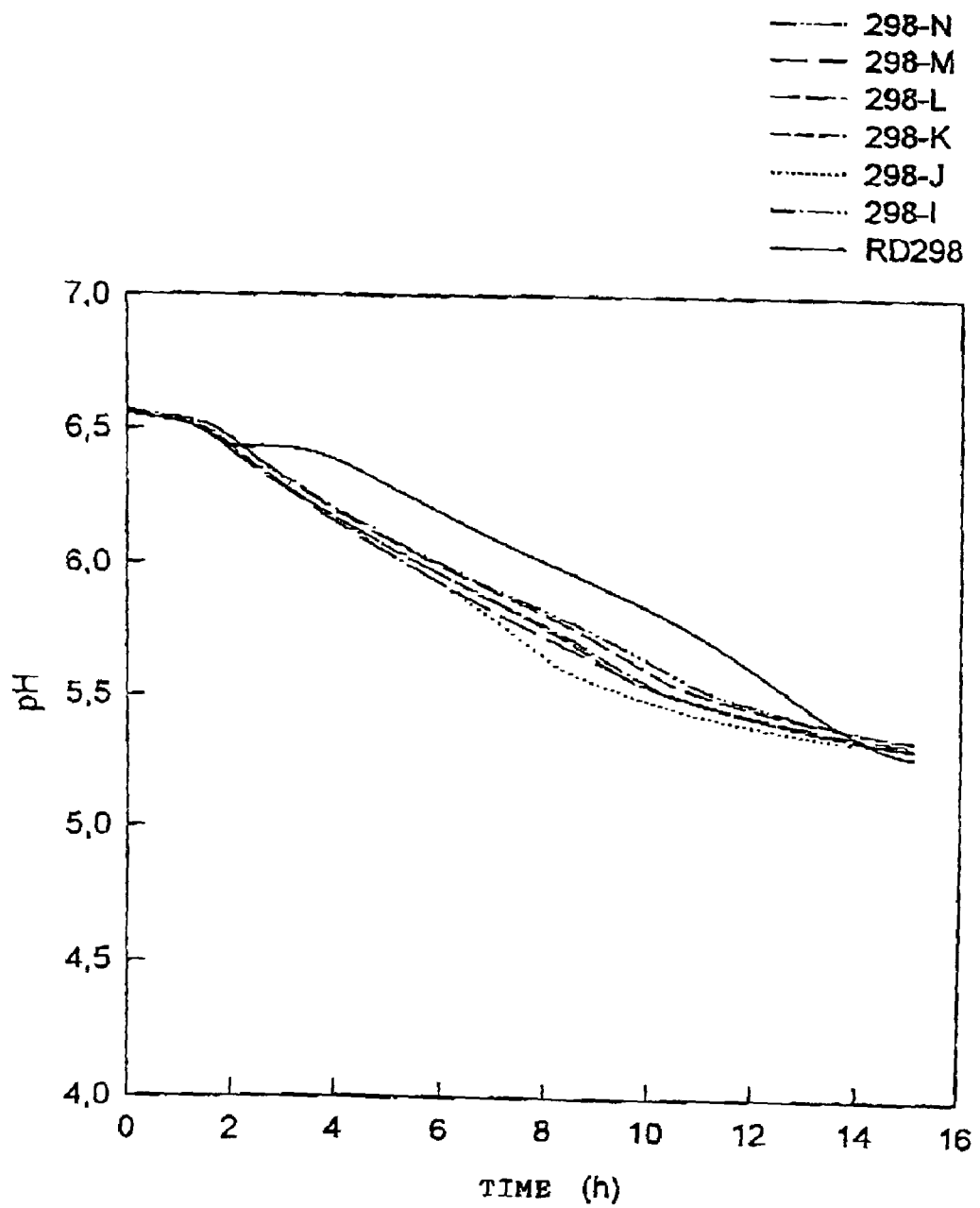
FIGS. 3A–3B depicts the acidification curves for UHT skimmed milk, obtained with the strain RD298 and with the spontaneous ur(−) mutants (FIG. 3A) or those obtained after treatment with NTG (FIG. 3B)
Figure 3B:
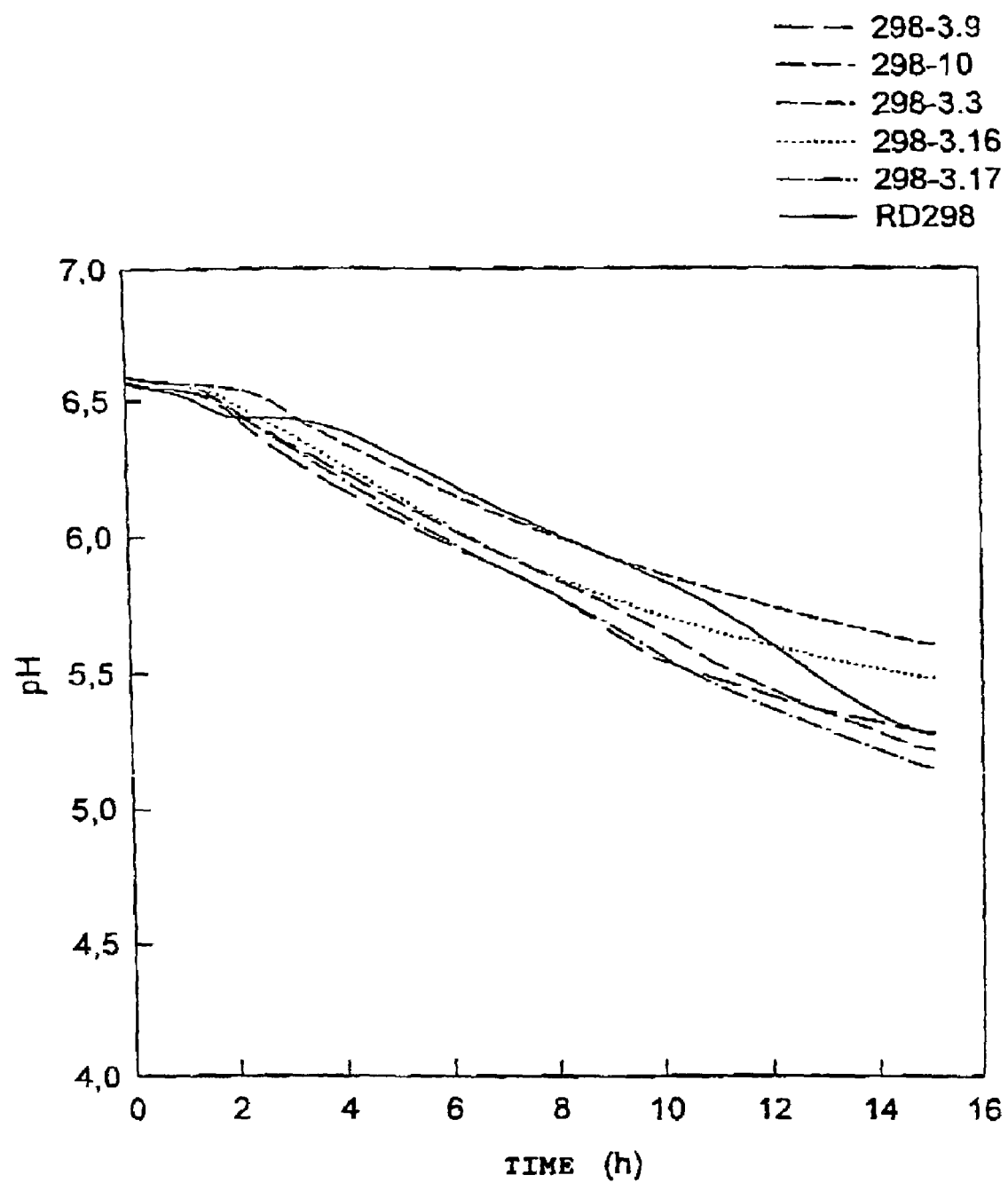

Cultures in UHT sterilized skimmed milk (Lactel®):

As for the cultures carried out in reconstituted milk, a temporary halt in the lowering of the pH is observed with the strain RD298, this phenomenon being absent in the cultures of the spontaneous ur(−) mutants (FIG. 3).

Figure 4A:
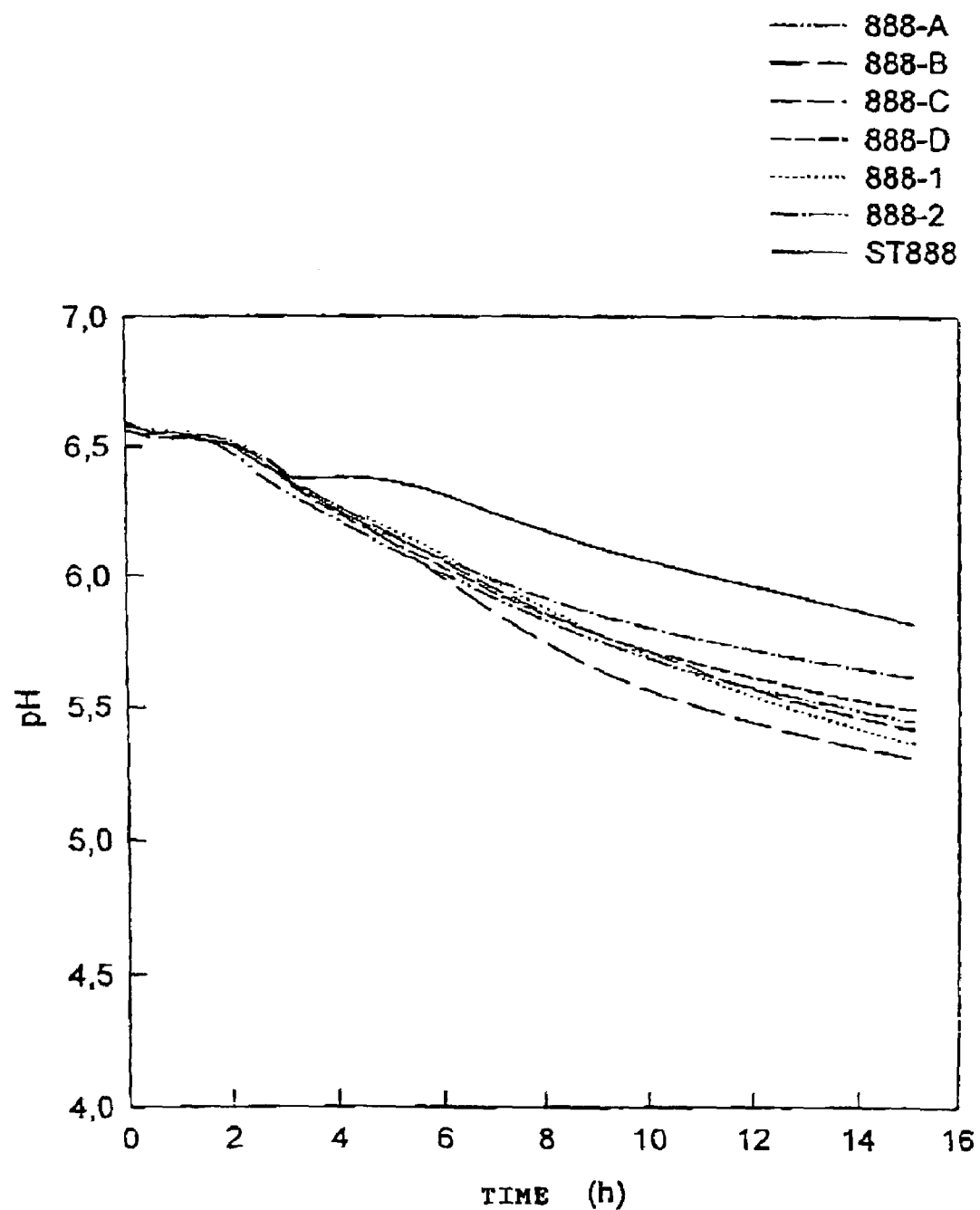
FIGS. 4A–4B depicts acidification curves for UHT skimmed milk, obtained with the strain ST888 and with the spontaneous ur(−) mutants (FIG. 4A) or those obtained after treatment with NTG (FIG. 4B).
Figure 4B:
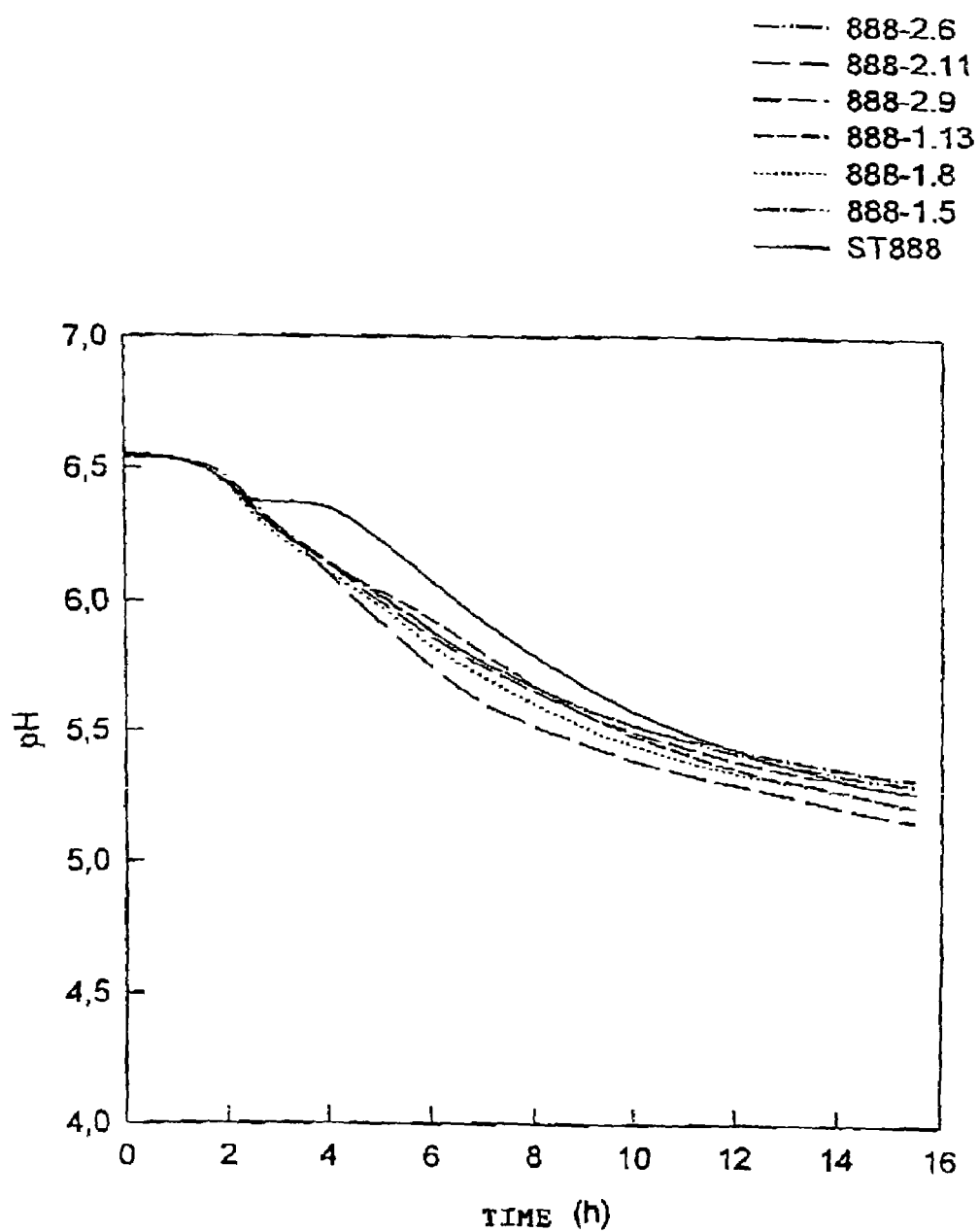

The ur(−) mutants isolated from ST888, whether they are spontaneous or obtained by treatment with NTG, have an acidification curve more regular than that of the parent strain (FIG. 4).

Figure 5A:
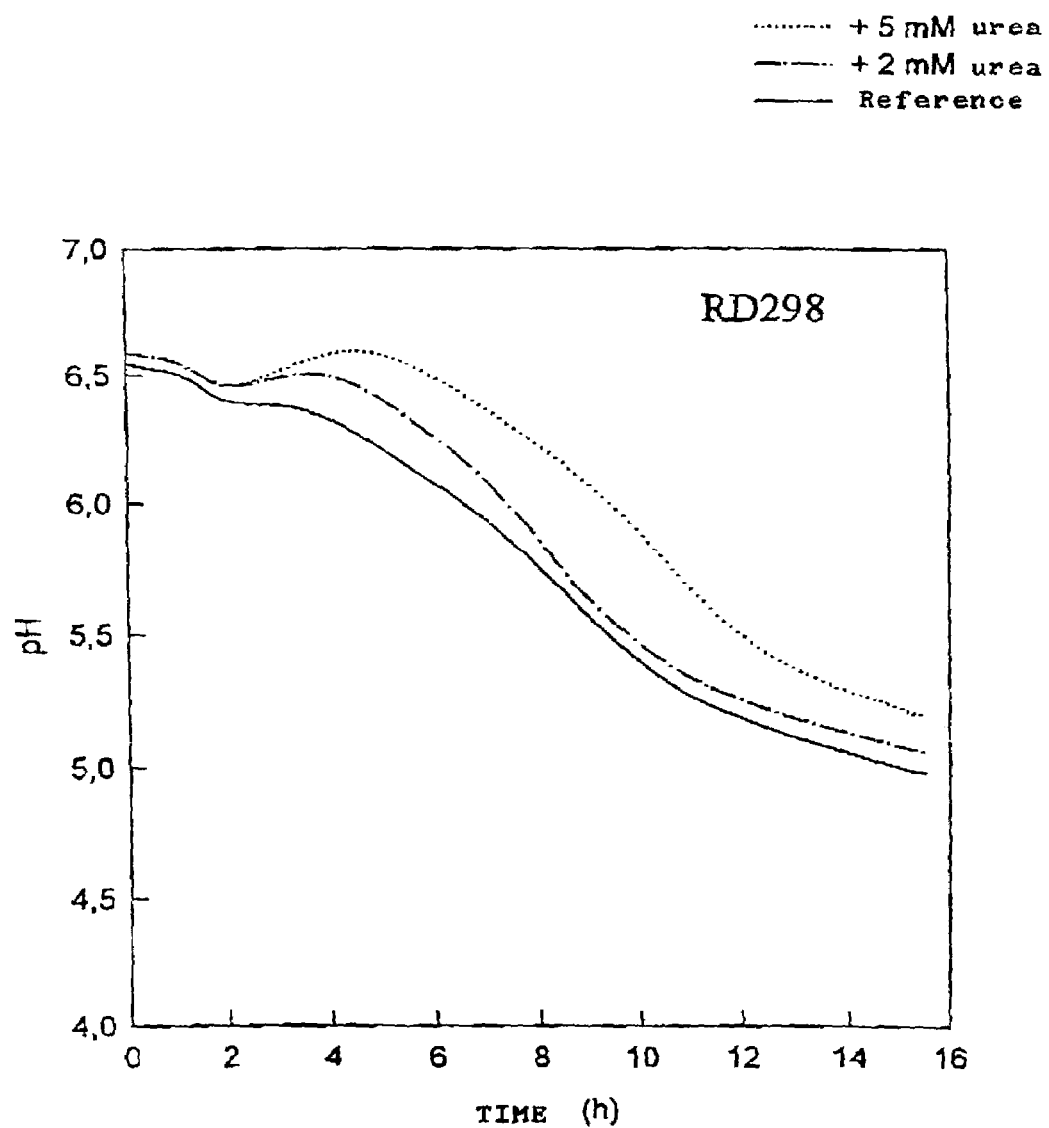
FIGS. 5A–5C depicts the acidification curves obtained with the strain RD298 (FIG. 5A) and the ur(−) mutants RD298-K (FIG. 5B) and RD298-10 (FIG. 5C), on UHT skimmed milk supplemented with different amounts of urea.
Figure 5B:
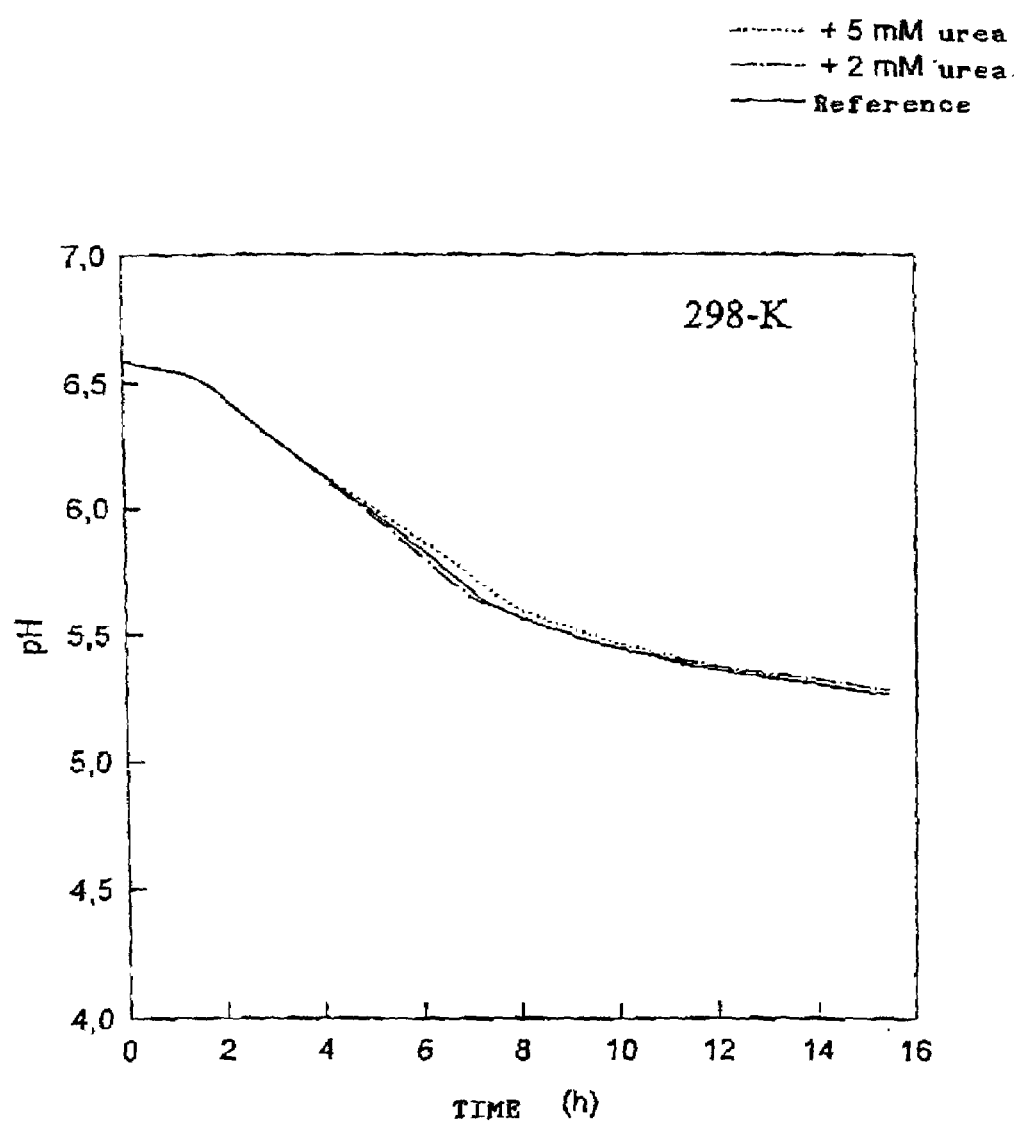
Figure 5C:
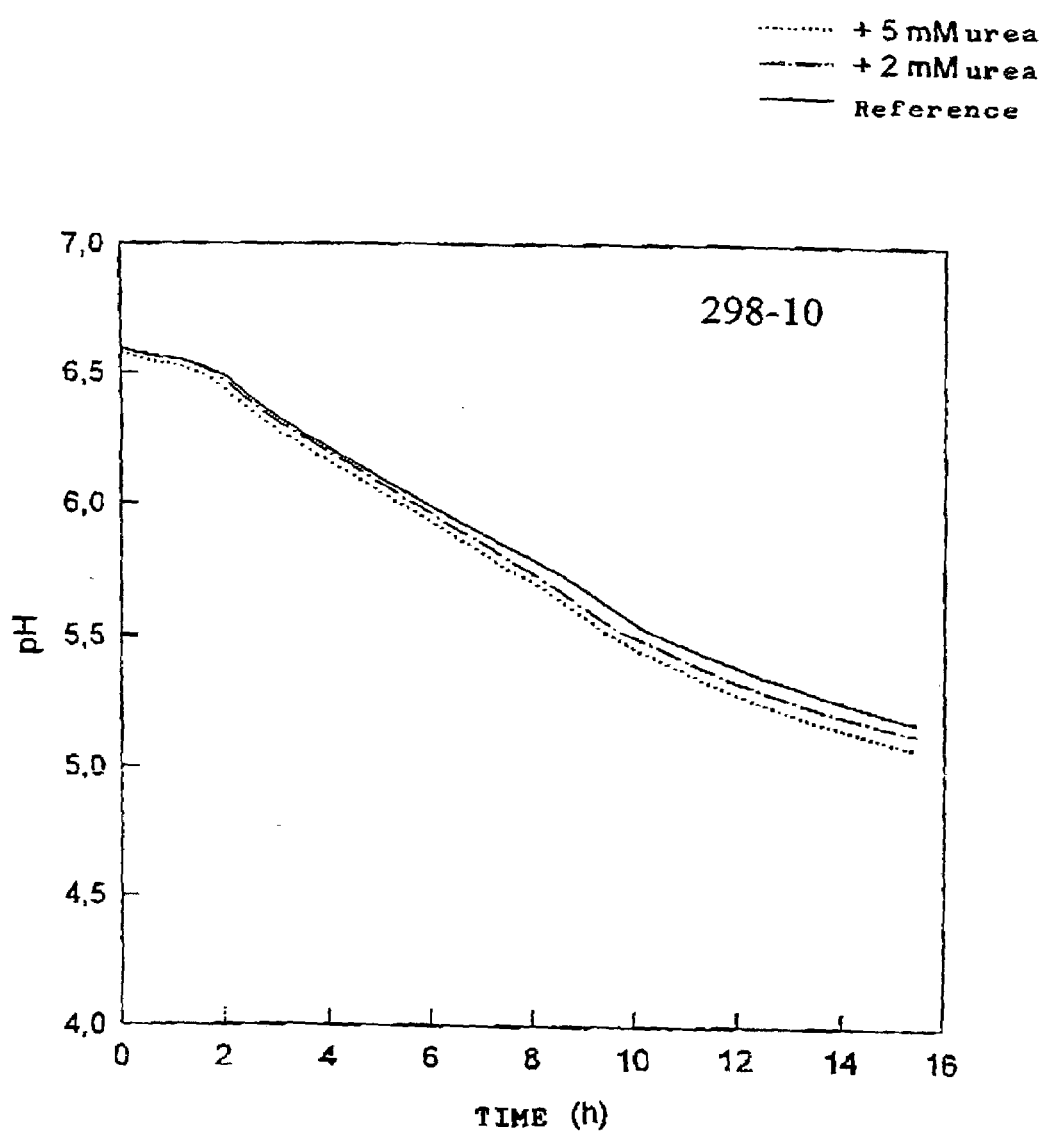

Effect of variations in the composition of the milk on the acidification curves:

The strain RD298, and the ur(−) mutants 298-K and 298-10, were cultured on UHT sterilized skimmed milk supplemented or nor with different amounts of urea. The initial urea concentration of the milk was equal to 3 mM and the urea contents of the different cultures were contained within the variation zones that are usually observed with cow's milk. It should be noted that, unlike the ur(−) mutants, the acidification curves obtained with the parent strain are highly dependent on the urea content of the milk (FIG. 5).

Figure 6A:
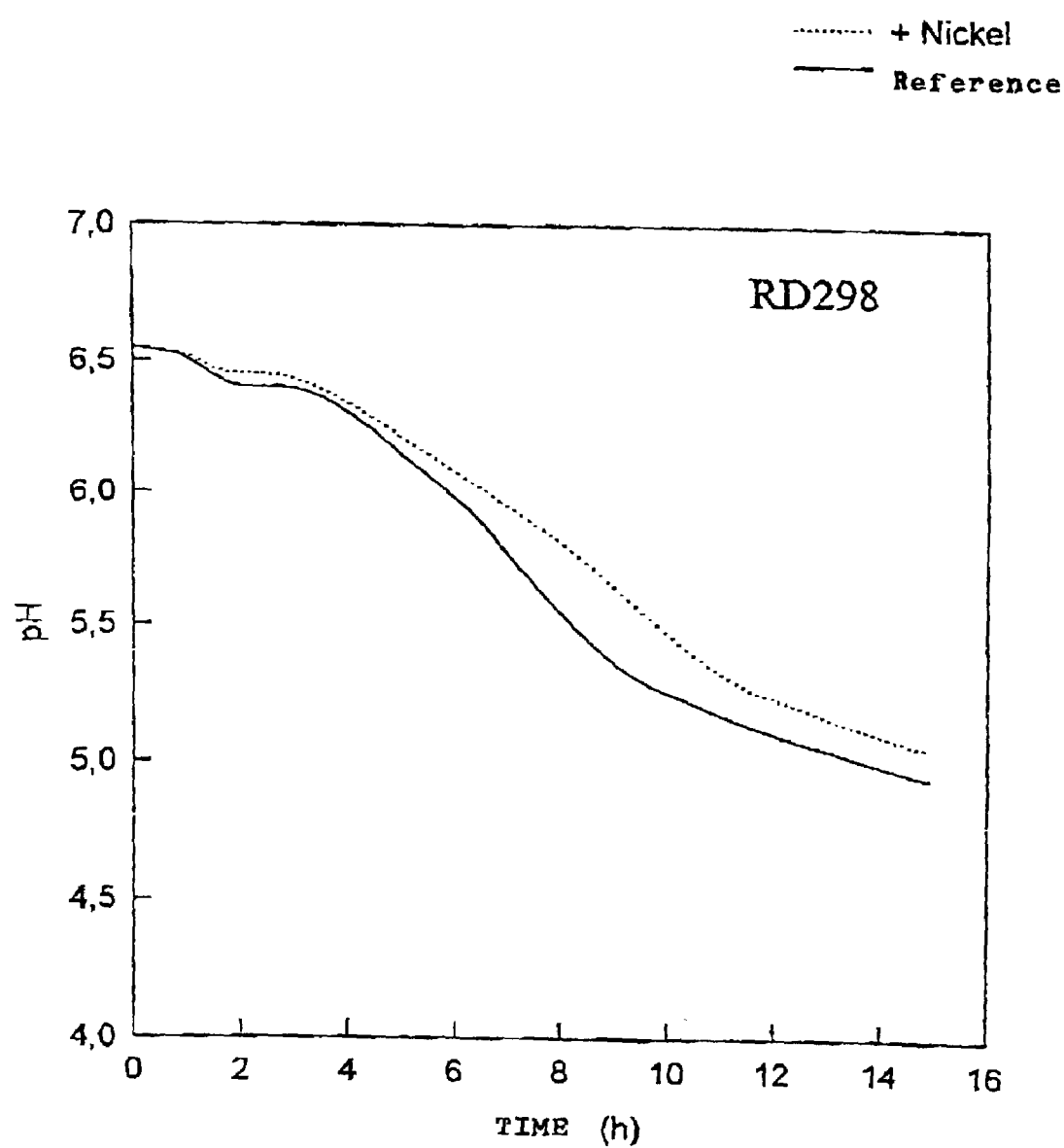
FIGS. 6A–6C depicts the acidification curves obtained with the strain RD298 (FIG. 6A) and the ur(−) mutants RD298-K (FIG. 6B) and RD298-10 (FIG. 6C), on UHT skimmed milk supplemented or not with nickel (10 μg/l of $NiSO_4.7H_2O$).
Figure 6B:
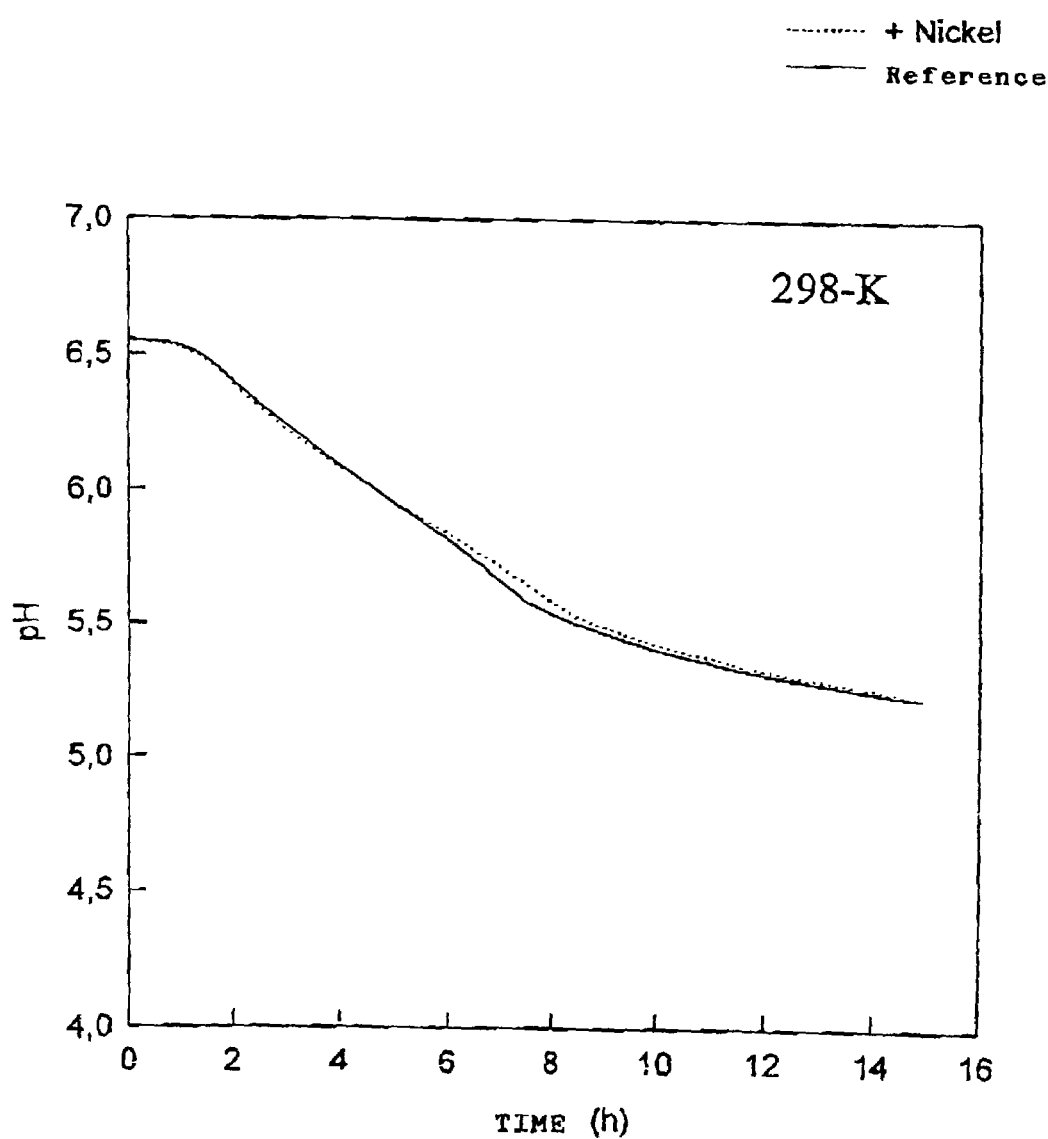
Figure 6C:
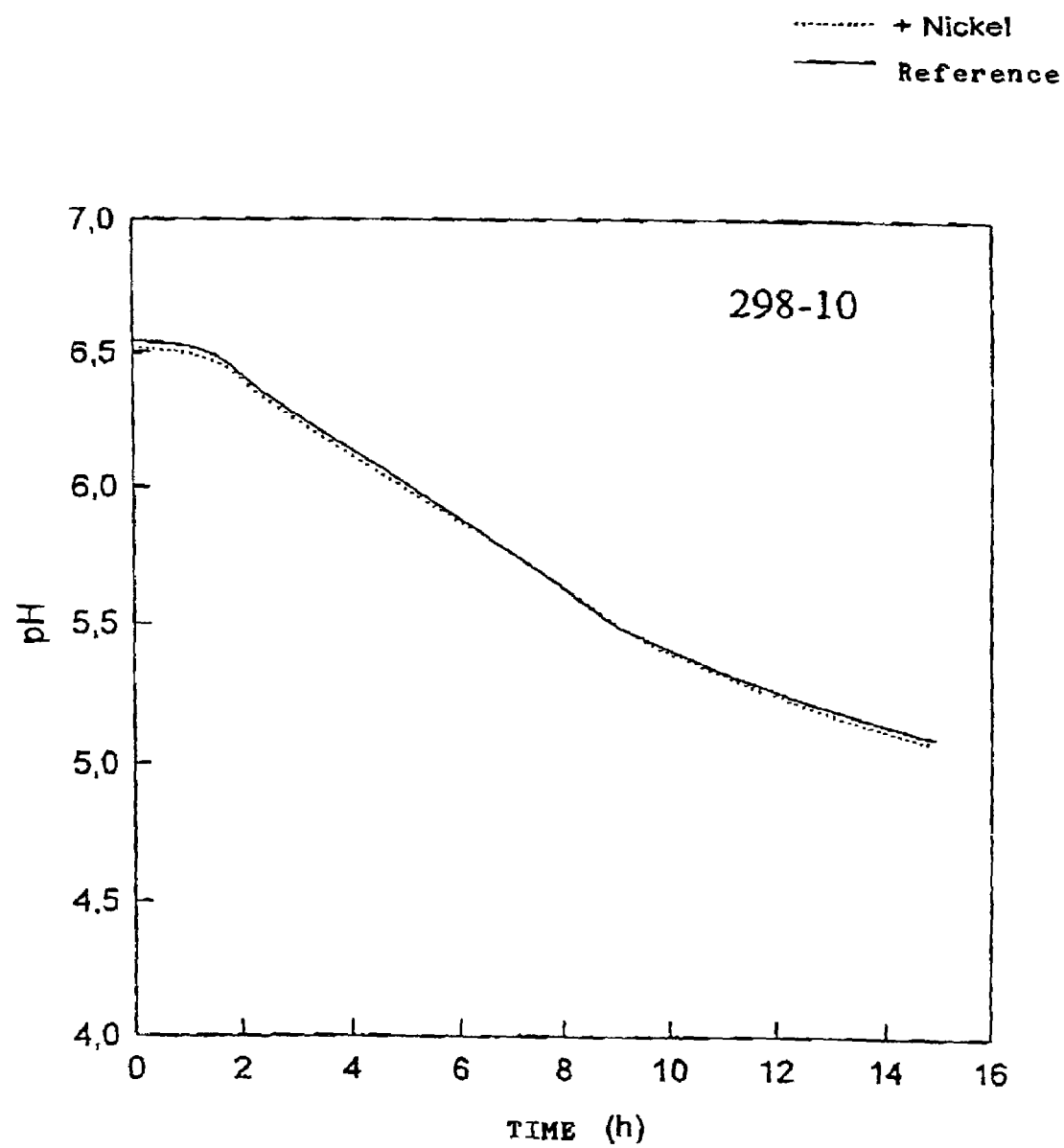

The authors of the present invention also observed that the acidification curves obtained with the parent strain are dependent on the nickel and cobalt content of the milk, which is not the case for the ur(−) mutants (FIG. 6).

Ammonia production:

In all the cultures described previously, it was observed that the strains RD298 and ST888 produced ammonia and hydrolyzed all the urea contained in the milk. No ammonia production was observed with the mutants. This indicates that urea is the main substrate used by *St. thermophilus* for producing ammonia. Thus the use of ur(−) strains makes it possible to avoid any ammonia production due to *St. thermophilus* during cheese manufacture. Consequently, the ammonia contents of cheese-making wheys can be limited.

Variability of the acidifying activities:

The authors of the present invention observed interestingly that the curves of acidification in reconstituted skimmed milk obtained with a number of ur(−) mutant strains had large variations compared with the curve obtained with their parent strain.

Figure 7:
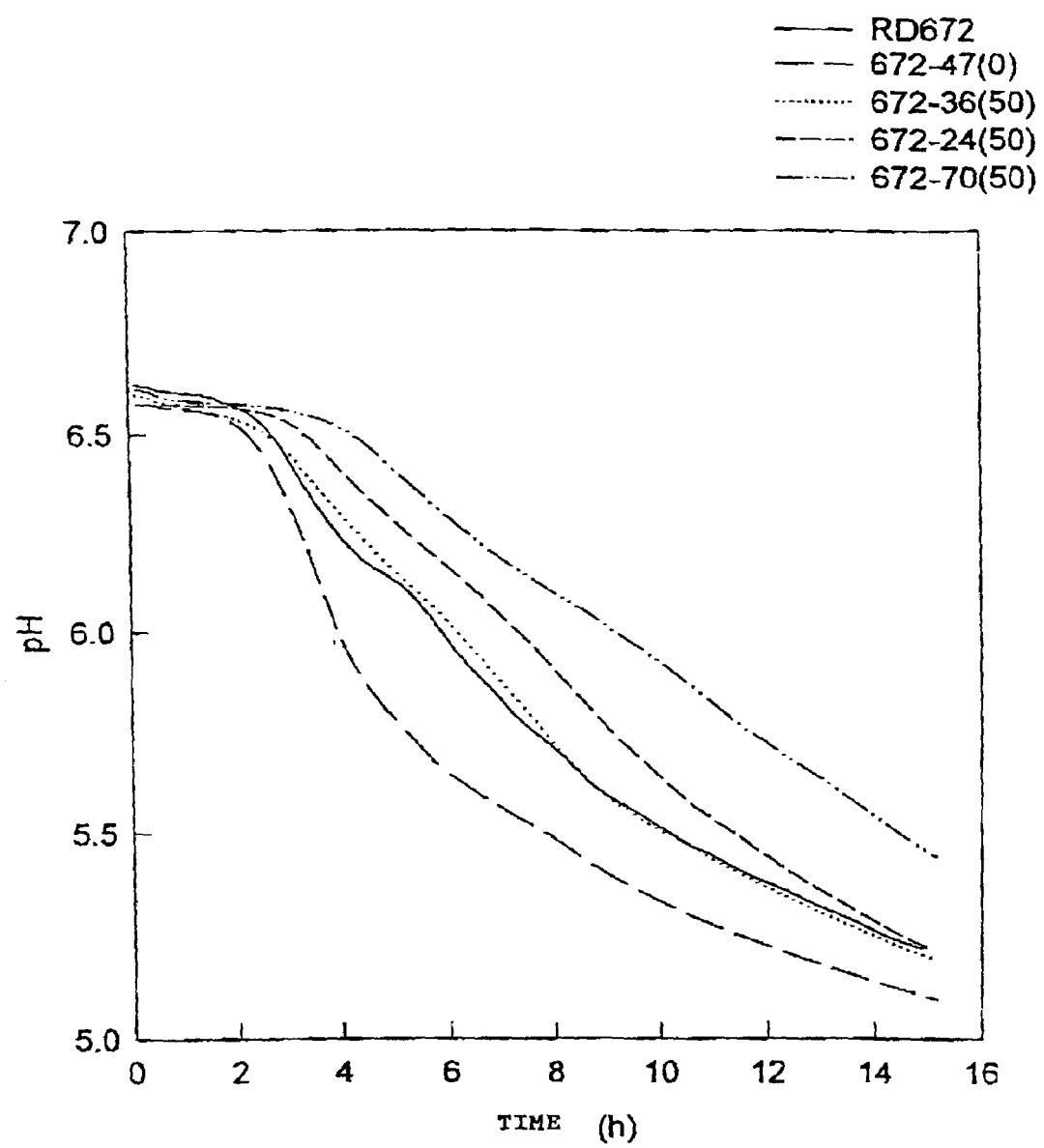
FIG. 7 depicts the acidification curves obtained with the strain RD672 and ur(−) mutants originating from this strain, on reconstituted skimmed milk.

FIG. 7 thus shows the acidification curves for reconstituted skimmed milk, obtained with the strain RD672, and with ur(−) mutants originating from this strain.

The strain RD672 is not very acidifying (solubilized soft cheese type technology). The mutant 672-47(0) is distinctly more acidifying than the parent strain, while the mutant 672-36(50) has a fairly similar acidification kinetic. The mutant 672-70 (0) is distinctly less acidifying than the parent strain and the mutant 672-24(50) is a little less acidifying than the parent strain.

Example 4

Manufacture of "Solubilized Soft Cheese" Type Cheeses Using Either the Ur(+) Industrial Strain Rd298 or the Ur(−) Mutant Strain 298-10 (a mutant of RD298).

a) General Points

Under the generic name cheese, there is found a very large number of products, having a technology, a flora and organoleptic properties which are very diverse.

Technologically speaking, cheese results in the first place from the coagulation of milk obtained by renneting, which will be followed by draining of the coagulum thus obtained (mechanical operations such as cutting, stirring and turning). During manufacture, the growth of the added ferments will cause a lowering of the pH of the coagulum. The acidification kinetic (the change in pH as a function of time) and the drainage kinetic condition the final composition of the curds and therefore the intrinsic characteristics of the cheeses. This is why, for a given technology, having control over the acidification and drainage kinetics is essential.

b) Specific Features of the "Solubilized Soft Cheese" Technology Used.

The manufacture of "solubilized soft cheese" type cheeses corresponds to the use of a technology with enzymatic dominance (important function of the rennet) with specific manufacturing temperature profiles, such as that described in Table 7.

The conduct of the draining is characterised by:
considerable acidification at the start of the method which conditions the draining level. The acidification is provided by *Streptococcus thermophilus*: the target pHs to be reached at the different manufacturing stages are summarized in Table 7;
fast removal of the whey increased by mechanical operations (cutting, stirring and moulding of the coagulum);
operations facilitating the removal of the whey (turning).

c) Monitoring of the Cheese Manufacturing

Table 7 summarises the different technological steps of the manufacturing carried out and shows the process times which were necessary in each test to reach the target pHs of each of these steps.

Two distinct milks were used, one containing less than 1 mM of urea and the other 5 mM of urea. The ferments used consisted either of the industrial strain RD298 known for its ability to hydrolyze urea, ur(+), or the strain 298-10, a spontaneous mutant of this strain lacking this urea hydrolysis ability, ur(−).

Monitoring the acidification of the milk containing a very small amount of urea (less than 1 mM) shows that the two strains used allow the target pHs of each step to be reached in approximately identical times. Similarly, these objectives are achieved with the ur(−) strain 298-10 when the manufacturing milk contains significant amounts of urea (5 mM). On the contrary, in order to meet the target manufacturing pHs with the strain RD298 in the milk containing 5 mm of urea, the process times have had to be considerably lengthened.

This study therefore demonstrates the certain technological advantage of the ur(−) mutant 298-10 compared with the ur(+) industrial mother strain RD298.

TABLE 7

Technological characteristics of a "solubilised soft cheese" type cheese manufacture and technological description of manufacturing carried out with the ur(+) strain RD298 or the ur(−) strain 298-10 used as ferments from milk containing either 5 mM of urea or less than 1 mM of urea.

| Manufacturing stage | Manufacturing temperature (° C.) | Target pH (±0.05) | Process time objectives (±10 min) | Actual process time (min) | | | |
|---|---|---|---|---|---|---|---|
| | | | | Milk with less than 1 mM of urea | | Milk containing 5 mM of urea | |
| | | | | RD298 | 298-10 | RD298 | 298-10 |
| Milk | 38 ± 0.5 | 6.48 | 0 ± 10 | 0 | 0 | 0 | 0 |
| Renneting | | 6.40 | 70 ± 10 | 70 | 60 | 100 | 60 |
| Moulding | | 6.30 | 120 ± 10 | 120 | 110 | 140 | 110 |
| 1st turning | 35 ± 0.5 | 6.20 | 180 ± 10 | 190 | 170 | 280 | 170 |
| 2nd turning | 26 ± 0.5 | 5.50 | 300 ± 10 | 310 | 310 | 450 | 310 |
| 3rd turning | 20 ± 0.5 | 5.25 | 540 ± 10 | 540 | 530 | 700 | 530 |

BIBLIOGRAPHY

Juillard V., Desmazeaud M. J., Spinnier H. E. 1988. Revelation of a ureasic activity in *Streptococcus thermophilus*. Canadian Journal of Microbiology. 34: 818–822.

Martin B., Coulon J. B., Chamba J. F., Bugaud C. 1997. Effect of milk urea content on characteristics of matured Reblochon cheeses. Lait. 77: 505–514.

Spinnier H. E., Corrieu G. 1989. Automatic method to quantify starter activity based on pH measurement. Journal of Dairy Research. 56: 755–764.

Terzaghi B. E., Sandine W. E. 1975. Improved medium for lactic *streptococci* and their bacteriophages. Applied Microbiology. 29: 807–813.

Tinson W., Broome M. C., Hillier A. J., Jago G. R. 1982a. Metabolism of *Streptococcus thermophilus*. 2. Production of CO2 and NH3 from urea. Australian Journal of Dairy Technology. 37: 14–16.

Tinson W., Ratcliff M. F., Hillier A. J., Jago G. R. 1982b. Metabolism of *Streptococcus thermophilus*. 3. Influence on the level of bacterial metabolites in cheddar cheese. Australian Journal of Dairy Technology. 37: 17–21.

What is claimed is:

1. A method for obtaining, during the manufacture of a dairy product selected from the group consisting of cheeses and other fermented dairy products, an acidification kinetic which is substantially independent of the content of the milk in terms of constituents which are involved in the metabolism of urea, said method comprising incorporating with the milk at least one strain of *Streptococcus thermophilus* which is incapable of hydrolyzing urea.

2. The method according to claim 1, in which the acidification kinetic is substantially independent of the urea content of the milk.

3. The method according to claim 1, in which the acidification kinetic of the milk is substantially independent of the nickel or cobalt content of the milk.

4. The method according to claim 1, in which the acidification kinetic of the milk does not exhibit any temporary slowing down.

5. A method according to claim 1, in which there is incorporated with the milk at least one mutant strain of *Streptococcus thermophilus* which is incapable of hydrolyzing urea, at a seeding rate lower than the seeding rate used for the parent strain of *Streptococcus thermophilus* capable of hydrolyzing urea.

6. A method according to claim 1, in which the *Streptococcus thermophilus* strain is the strain 298-K registered at the CNCM under number I-2311.

7. The method according to claim 1, in which the *Streptococcus thermophilus* strain is the strain 298-10 registered at the CNCM under the number I-2312.

* * * * *